US009816458B2

(12) United States Patent
Sakai

(10) Patent No.: US 9,816,458 B2
(45) Date of Patent: Nov. 14, 2017

(54) ENGINE COMBUSTION CHAMBER STRUCTURE AND MANUFACTURING METHOD THEREOF

(75) Inventor: Takenobu Sakai, Toyota (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 1408 days.

(21) Appl. No.: 13/264,626

(22) PCT Filed: Apr. 4, 2010

(86) PCT No.: PCT/JP2010/056957

§ 371 (c)(1),
(2), (4) Date: Nov. 8, 2011

(87) PCT Pub. No.: WO2010/119977

PCT Pub. Date: Oct. 21, 2010

(65) Prior Publication Data

US 2012/0042859 A1 Feb. 23, 2012

(30) Foreign Application Priority Data

Apr. 15, 2009 (JP) ................................ 2009-099132

(51) Int. Cl.
*B32B 15/04* (2006.01)
*F02F 1/24* (2006.01)
(Continued)

(52) U.S. Cl.
CPC ................ *F02F 1/24* (2013.01); *C25D 11/08* (2013.01); *C25D 11/10* (2013.01); *F02F 1/00* (2013.01);
(Continued)

(58) Field of Classification Search
CPC ........ F02F 1/24; F02F 1/00; F02F 3/10; F02F 3/14; Y10T 29/49272; F02B 23/00;
(Continued)

(56) References Cited

U.S. PATENT DOCUMENTS 3,953,625 A * 4/1976 Quaintance et al. ......... 427/258
4,205,649 A 6/1980 Ostermann et al.
(Continued)

FOREIGN PATENT DOCUMENTS

JP 52-153017 A 12/1977
JP 54084419 U 6/1979
(Continued)

OTHER PUBLICATIONS

"Aluminum alloy anodic oxidation and surface treatment technology," Syu Soho, p. 107, Chemical Industrial Publisher, Industrial Equipment and Information Steps Publishing Center, Jul. 31, 2004.
(Continued)

*Primary Examiner* — Marguerite McMahon
(74) *Attorney, Agent, or Firm* — Sughrue Mion, PLLC

(57) ABSTRACT

An object of the present invention is to enhance the thermal efficiency of an engine, to provide a film having low thermal conductivity and low heat capacity and being free from separation, drop-off and the like and excellent in durability and reliability. According to the present invention, an engine combustion chamber structure, wherein an anodic oxide film having a thickness of from more than 20 μm to 500 μm and a porosity of 20% or more is formed on the inner surface of the engine combustion chamber, and a manufacturing method thereof are provided.

7 Claims, 5 Drawing Sheets

(51) Int. Cl.

| | |
|---|---|
| ***F02F 1/00*** | (2006.01) |
| ***F02F 3/10*** | (2006.01) |
| ***F02F 3/14*** | (2006.01) |
| ***C25D 11/08*** | (2006.01) |
| ***C25D 11/10*** | (2006.01) |
| *F02B 23/00* | (2006.01) |
| *F02B 23/06* | (2006.01) |

(52) U.S. Cl.

CPC .................. *F02F 3/10* (2013.01); *F02F 3/14* (2013.01); *F02B 23/00* (2013.01); *F02B 2023/0609* (2013.01); *F05C 2203/0869* (2013.01); *F05C 2253/12* (2013.01); *Y10T 29/49272* (2015.01)

(58) Field of Classification Search

CPC ...... F02B 2023/0609; F05C 2203/0869; F05C 2253/12; C25D 11/08; C25D 11/10

USPC ........................... 123/193.6, 193.5, 657, 668

See application file for complete search history.

(56) References Cited

U.S. PATENT DOCUMENTS

| | | | | | |
|---|---|---|---|---|---|
| 4,727,832 | A * | 3/1988 | Miyamura et al. | ........ | 123/90.44 |
| 4,798,770 | A | 1/1989 | Donomoto et al. | | |
| 6,322,689 | B1 * | 11/2001 | Omasa | .......................... | 205/324 |
| 2005/0022780 | A1 * | 2/2005 | Imai et al. | .................... | 123/306 |
| 2007/0218303 | A1 * | 9/2007 | Ogawa et al. | ............ | 428/472.2 |
| 2011/0284385 | A1 * | 11/2011 | Turner et al. | ................... | 205/80 |

FOREIGN PATENT DOCUMENTS

| | | | | |
|---|---|---|---|---|
| JP | 59-84240 | U | | 6/1984 |
| JP | 61268850 | A | | 11/1986 |
| JP | 63170546 | A | | 7/1988 |
| JP | 1-43145 | B2 | | 9/1989 |
| JP | 08151953 | A | | 6/1996 |
| JP | 8-177622 | A | | 7/1996 |
| JP | 2000-26997 | A | | 1/2000 |
| JP | 2000109996 | A | | 4/2000 |
| JP | 2001263158 | A | * | 9/2001 |
| JP | 2002-364369 | A | | 12/2002 |
| JP | 2002365791 | | | 12/2002 |
| JP | 2003003296 | A | * | 1/2003 |
| JP | 20030013801 | A | * | 1/2003 |
| JP | 2003-113737 | A | | 4/2003 |
| JP | 2003-211002 | A | | 7/2003 |
| JP | 200418928 | | | 1/2004 |
| JP | 2005349692 | A | * | 12/2005 |
| JP | 3751498 | B2 | | 3/2006 |
| JP | 2007-308757 | A | | 11/2007 |
| JP | 2007284784 | A | | 11/2007 |
| JP | 2008249251 | A | | 10/2008 |
| JP | 2010116862 | A | | 5/2010 |
| WO | 2009/020206 | A1 | | 2/2009 |

OTHER PUBLICATIONS

"Aluminum alloy anodic oxidation and surface treatment technology", Jul. 31, 2004, p. 103.

Victor W. Wong et al.: "Assessment of Thin Thermal Barrier Coatings for I.C. Engines", SAE950980, pp. 1-11, published Feb. 1995.

Chigrinova, N. M. et al., "Analysis of Heat Stresses of the Parts of the Cylinder-Piston Group with Heat-Protective Coatings in an Internal-Combustion Engine", Journal of Engineering Physics and Thermophysics, 2004, vol. 77, No. 3, pp. 578-589.

Verein Deutscher Ingenieure, "Anrißverzögernde Wirkung hartanodischer Schichten auf thermisch hochbelasteten Nutzfahrzeug-Dieselkolben", Düsseldorf: VDI-Verlag GmbH, 1983, Ed. Reihe 1 Nr. 105, ISBN: 3-18-140501-B, 67 pages total.

* cited by examiner

ENGINE COMBUSTION CHAMBER STRUCTURE AND MANUFACTURING METHOD THEREOF

CROSS REFERENCE TO RELATED APPLICATIONS

This application is a National Stage of International Application No. PCT/JP2010/056957, filed on Apr. 14, 2010, which claims priority from Japanese Patent Application No. 2009-099132, filed on Apr. 15, 2009, the contents of all of which are incorporated herein by reference in their entirety.

TECHNICAL FIELD

The present invention relates to a structure for a combustion chamber of an engine, such as a reciprocating engine and a manufacturing method thereof.

BACKGROUND ART

An engine is powered by burning of fuel such as gasoline and utilizing the produced power. In a normal 4-cycle engine, four strokes of intake, compression, expansion (combustion) and exhaust are one cycle and repeated.

An increase in the thermal efficiency of the engine is effective in improving the fuel efficiency or exhaust gas temperature and thereby enhances the catalytic activity. Accordingly, efforts to increase thermal efficiency of an engine are still continuing at present.

In order to increase the thermal efficiency of an engine, retaining of heat during combustion may be first considered. To realize this, the temperature in the combustion chamber is preferably high in the expansion (combustion) stroke. In this case, the property required of the wall surface of the combustion chamber is low thermal conductivity, i.e., high thermal insulation property. As for the thermal insulation technique that has been heretofore studied, an engine in which a ceramic coating is applied or the combustion chamber itself is composed of ceramic, while forming an air layer on the back of the chamber, and thermal insulation is thereby achieved is known. This technique is characterized in that the heat loss from the combustion chamber to cooling water is reduced by causing the wall surface to act as a thermal barrier and the energy is recovered by piston work or a turbo charger so as to enhance the thermal efficiency.

However, if the thermal insulation property is excessively enhanced, the wall temperature of the combustion chamber increases the operating gas heat and this causes impairment of the intake efficiency and an increase of NOx emissions. Furthermore, a high temperature heat-shielding layer disadvantageously results in a problem of lubricity.

To overcome this problem, a heat-shielding technique causing no rise in the wall temperature of the combustion chamber is required in the intake stroke. Specifically, this is a technique where, as the material characteristics, a heat-shielding film having low thermal conductivity and low heat capacity is formed on the wall surface of the combustion chamber and the wall surface temperature is varied according to the gas temperature (a low temperature during intake and a high temperature during combustion), whereby the temperature difference between the combustion gas and the wall surface is reduced and prevention of intake air heating and reduction of heat loss are simultaneously attained.

Non-Patent Document 1 (Victor W. Wong, et al., *Assessment of Thin Thermal Barrier Coatings for I.C. Engines*, Society of Automobile Engineers, Document Number: 950980, Sate Published: February 1995) describes a technique where a thin-film material having low thermal conductivity and low heat capacity is formed on the wall surface of the combustion chamber so as to simultaneously attain the reduction of heat loss and the prevention of intake gas overheating based on the above. A sprayed film of $ZrO_2$ is described as a specific thin-film material. However, the sprayed film of $ZrO_2$ readily causes separation or drop-off, and durability/reliability being insufficient remains.

Meanwhile, with the recent increase in engine power, the temperature in the combustion chamber becomes high and the local heat load tends to rise in the combustion chamber, which may lead to generation of thermal strain or cracking in the member constituting the combustion chamber.

For reducing such thermal strain, Patent Document 1 (Kokai (Japanese Unexamined Patent Publication) No. 2003-113737, description) describes a technique of forming a porous ceramic layer by anodic oxidation on a cylinder head constituting a part of the combustion chamber and thereby reducing thermal conduction from the combustion chamber to the cylinder head.

Also, for reducing the cracking, Patent Document 2 (Kokai No. 1-43145, description) describes a technique of forming an alumite layer by anodic oxidation on a piston top constituting a part of the combustion chamber, and further forming a ceramic layer by spraying, thereby reducing thermal conduction from the combustion chamber to the piston top.

As described above, Patent Documents 1 and 2 are intended to achieve reduction of thermal conduction. However, when only thermal conduction is reduced, the wall temperature of the combustion chamber rises causing intake gas overheating and there remains a problem that an impairment of the intake efficiency and an increase of the NOx emissions are incurred.

RELATED ART

Patent Document

Patent Document 1: Kokai No. 2003-113737, description
Patent Document 2: Kokai No. 1-43145, description

Non-Patent Document

Non-patent Document 1: Victor W. Wong, et al., *Assessment of Thin Thermal Barrier Coatings for I.C. Engines*, Society of Automobile Engineers, Document Number: 950980, Date Published: February 1995).

SUMMARY OF THE INVENTION

Problems to be Solved by the Invention

An object of the present invention is to enhance the thermal efficiency of an engine, provide a film having low thermal conductivity and low heat capacity and being free from separation, drop-off and the like and excellent in durability and reliability.

Means to Solve the Problems

According to the present invention, the following are provided.

(1) An engine combustion chamber structure, wherein an anodic oxide film having a thickness of from more than 20

μm to 500 μm and a porosity of 20% or more is formed on the inner surface of the engine combustion chamber.

(2) The engine combustion chamber structure as described in (1), wherein the thickness of the film is from 50 to 300 μm.

(3) The engine combustion chamber structure as described in (1) or (2), wherein the porosity of the film is from 20 to 70%.

(4) The engine combustion chamber structure as described in any one of (1) to (3), wherein the anodic oxide film has a thermal conductivity of 7.8 W/mK or less and a volumetric heat capacity of 800 kJ/$m^3$K or less.

(5) A method for manufacturing the engine combustion chamber structure described in any one of (1) to (4), comprising:

preparing an aqueous solution containing at least one of phosphoric acid, oxalic acid, sulfuric acid and chromic acid, as an electrolytic solution used for anodic oxidation, in which the concentration of the electrolytic solution is from 0.2 to 1.0 mol/l and the temperature of the electrolytic solution is from 20 to 30° C., and performing an anodic oxidation treatment by using the electrolytic solution.

(6) The method as described in (5), comprising:

performing the anodic oxidation treatment by using, as an anode, a desired portion of a member constituting the engine combustion chamber such that when the engine combustion chamber is fabricated, an anodic oxide film is formed on the inner surface of the combustion chamber.

MODE FOR CARRYING OUT THE INVENTION

Figure 1:
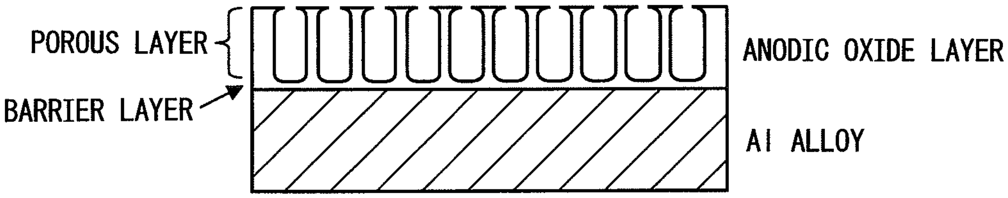
FIG. 1 shows an outline of the cross-sectional structure of an anodic oxide film having pores, illustrating that the pore size is made large by performing a low-voltage treatment in the initial stage of anodic oxidation and thereafter increasing the voltage.

The present invention is characterized in that an anodic oxide film having a thickness of from more than 20 μm to 500 μm and a porosity of 20% or more is formed on the inner surface of the engine combustion chamber.

The engine combustion chamber indicates a space surrounded by a bore inner surface of a cylinder block, a top surface of a piston disposed in the bore, and a bottom surface of a cylinder head disposed to face the top surface of the cylinder block.

The material of the member (e.g., cylinder block, piston, cylinder block) constituting the engine combustion chamber is selected from materials capable of anodic oxidation. For example, the material may be an aluminum alloy, a magnesium alloy or a titanium alloy.

Anodic oxidation is an oxidation reaction occurring at the anode during electrolysis. In the anode, an electron moves from the electrolytic solution side into the anode and therefore, an oxidizable substance (this may be an electrode material) in the electrolytic solution is oxidized. The oxide film produced in the anode by this anodic oxidization is an anodic oxide film. The anodic oxide film is formed to continue from the anode material surface and therefore, the obtained surface treatment layer has high adherence and uniformity, is less likely to cause separation, cracking, drop-off or the like, for example, in long-term operation, and offers high reliability.

The electrolytic solution for use in the anodic oxidation may be appropriately selected according to the anode material. As the electrolytic solution, an aqueous solution of phosphoric acid, oxalic acid, sulfuric acid, chromic acid or the like can be used. Incidentally, the concentration of the electrolytic solution is generally from 0.2 to 1.0 mol/l, and the temperature of the electrolytic solution is generally from 20 to 30° C.

Before forming the anodic oxide film, the surface of the anode material may be pretreated for the purpose of cleaning or the like. The pretreatment may be performed by a mechanical, chemical or electrochemical method and in the present invention, the method is not particularly limited.

A desired portion of a member constituting the engine combustion chamber is used as the anode such that when the engine combustion chamber is fabricated, an anodic oxide film is formed on the inner surface of the combustion chamber. The portion to be protected from anodic oxidation, if any, may be subjected to appropriate masking or the like.

In the anodic oxide film of the present invention, the thickness is from more than 20 μm to 500 μm. The thickness is preferably from 50 to 300 μm, because the thermal property (thermal conductivity and volumetric heat capacity) is balanced and in turn, the improvement ratio of fuel efficiency can be more increased.

The film thickness is a factor affecting the thermal property of the film and eventually an important factor affecting the fuel consumption of the engine. When the film thickness is large, the heat conductivity of the film decreases but if the film thickness is too large, the heat capacity of the film increases. Conversely, when the film thickness is small, the heat capacity of the film decreases but if the film thickness is too small, the heat conductivity of the film increases. Furthermore, the film thickness is also a factor affecting the durability and reliability. A too large or too small film thickness results in an increase in separation, drop-off or the like. With a film thickness in the specified range above, these disadvantages can be avoided and the optimal effects of the present invention can be obtained.

Generally, as the anodic oxidation treatment time is longer, the thickness of the film is larger. In the case where an aluminum alloy and an oxalic acid solution are used as the anode and the electrolytic solution, respectively, and the anode voltage is set to 40 V, the thickness of the anodic oxide film can be increased in the range of 20 to 500 μm by prolonging the anodic oxidation time in the range of 30 minutes to 15 hours.

In the anodic oxide film of the present invention, the porosity is 20% or more. The porosity is preferably 30% or more, because the thermal property (thermal conductivity and volumetric heat capacity) is further reduced and in turn, the improvement ratio of fuel efficiency can be more increased. In the anodic oxide film of the present invention, the porosity is 70% or less. The porosity is preferably 60% or less, because if the porosity is too high, the fear of separation, drop-off or the like increases.

In the present invention, the porosity of the anodic oxide film is determined as follows. The conventional method for measuring the porosity is a method of determining the porosity by the adsorbed amount of nitrogen gas or the like when the pore size is in the micrometer order, but the pore size obtained by anodic oxidation of the present invention is in the nanometer order, and the conventional porosity measuring method cannot be used. Therefore, the ratio of the area occupied by pores in the SEM observation surface (pore area/observation surface area) after polishing the outermost surface of the anodic oxide film is taken as the porosity (see, FIG. 2(*c*)).

The porosity is a factor affecting the thermal property of the film and in turn, an important factor affecting the fuel consumption of the engine. As the porosity is larger, the heat conductivity and heat capacity of the film are decreased and eventually, the fuel efficiency is improved, but if the porosity is too large, the fear of separation, drop-off or the like is increased and the durability and reliability of the film are impaired. The porosity may be decreased for enhancing the durability and reliability, but if the porosity is too small, the heat conductivity and heat capacity of the film are increased and this leads to decrease of fuel efficiency. With a porosity in the specified range above, these disadvantages can be avoided and optimal effects of the present invention can be obtained.

The porosity can be generally controlled by varying the applied voltage and the kind of the electrolytic solution at the anodic oxidation treatment. In general, as the applied voltage is higher, the porosity becomes large. The maximum applied voltage can be changed by changing the kind of the electrolytic solution. In general, an electrolytic solution using sulfuric acid allows for a maximum applied voltage of 25 V, an electrolytic solution using oxalic acid allows for a maximum applied voltage of 40 V, and an electrolytic solution using phosphoric acid allows for a maximum applied voltage of 195 V. In the case where an aluminum alloy and a sulfuric acid, an oxalic acid, a chromic acid or a phosphoric acid are used as the anode and the electrolytic solution, respectively, and the anodic oxidation time is set to 3 to 4 hours, when the maximum applied voltage is increased in the range of 25 to 190 V, the porosity of the anodic oxide film can be increased in the range of 20 to 70%. Incidentally, the anodic oxidation time is varied here in the range of 3 to 4 hours so that the film thickness can be kept constant (100 μm).

FIG. 1 illustrates that the pore size is made large by setting the applied voltage low in the initial stage of anodic oxidation and thereafter increasing the applied voltage.

EXAMPLES

The anodic oxide film of the present invention is described below by referring to Examples.

(Formation Method of Sample No. 1)

An aluminum foil (thickness: 100 μm) with aluminum purity IN30 (JIS) was degreased using an alkali solution and then subjected to an anodic oxidation treatment in an aqueous 0.8 M sulfuric acid solution (ordinary temperature: 25° C.). At the anodic oxidation, an initial voltage of 10 V was applied and after 3.5 hours, the voltage applied was changed to 25 V and continuously applied for 30 minutes. As a result, an anodic oxide film of 100 μm was obtained.

(Formation Method of Sample Nos. 2 to 6)

Sample Nos. 2 to 6 were formed by changing the maximum applied voltage and the kind of the electrolytic solution in the anodic oxidation treatment. The anodic oxidation time was adjusted in the range of 3 to 4 hours so that an anodic oxide film of 100 μm could be obtained. The initial voltage was set to 10 V, and the maximum applied voltage was applied for 30 minutes in the final step of the anodic oxidation treatment. Other sample formation conditions were the same as those of Sample No. 1.

(Thermal Property of Anodic Oxidation Film)

Figure 2:
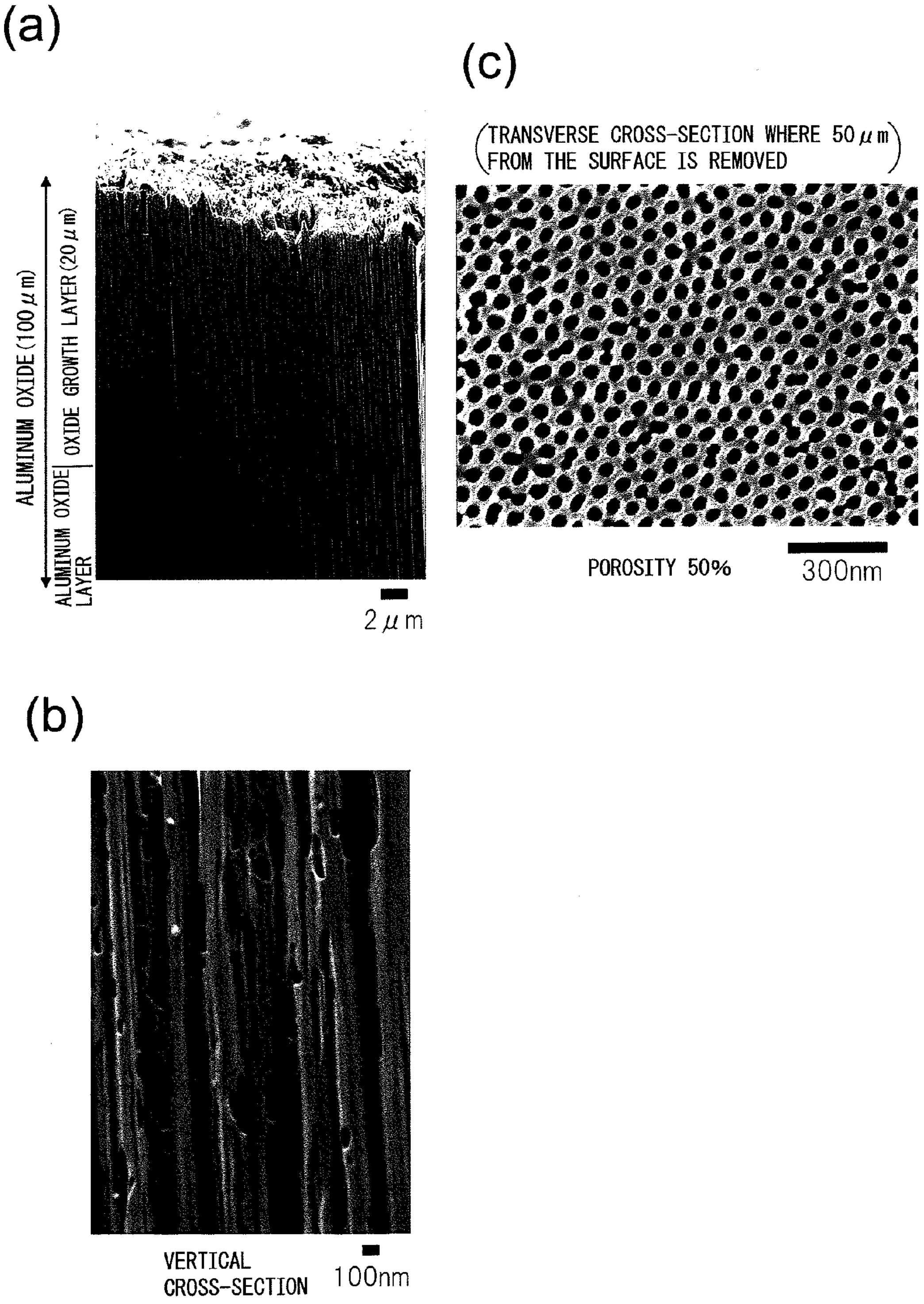
FIG. 2 shows electron micrographs of the cross-section of an anodic oxide film having pores; a) shows the cross-section (part in wide range) of the anodic oxide film having pores, b) shows the vertical cross-section (enlarged part), and c) shows the transverse cross-section where 50 μm from the surface is removed.

With respect to the anodic oxide films obtained by the treatment above, a slice was observed through a transmission electron microscope (see, FIG. 2) and measured for the pore size and pore length of the pore and the thickness and width of the anodic oxide film, and the porosity was determined. FIG. 2(*a*) is the cross-section of the anodic oxide film having pores, FIG. 2(*b*) is the vertical cross-section thereof, and FIG. 2(*c*) is a photograph of the transverse cross-section where 50 μm from the surface is removed. These measurement results are shown in Table 1 together with the anodic oxidation conditions.

Furthermore, for measuring the thermal conductivity and volumetric heat capacity of the anodic oxide film, anodic oxide film test pieces of 25 mm in diameter were prepared under the same anodic oxide film formation conditions as those of Nos. 1 to 6 except that the anodic oxidation time was prolonged. These anodic oxide films were measured for the thermal conductivity and the volumetric heat capacity in accordance with a laser flash method (JIS R1611). As the measurement apparatus, LF/TCM-FA8510B manufactured by Rigaku Corporation and LFA-501 manufactured by Kyoto Electronics Manufacturing Co., Ltd. were used. The obtained results are shown in Table 1.

TABLE 1

Table 1: Anodic Oxidation Conditions and Relationship Between Film Structure and Thermal Property

| | Anodic Oxidation Conditions | | | Film Structure (thickness: 100 μm) | | Thermal Property | |
|---|---|---|---|---|---|---|---|
| Sample No. | Electrolytic Solution | Maximum Applied Voltage (V) | Time (h) | Pore Size (nm) | Porosity (vol. %) | Thermal Conductivity (W/mK) | Volumetric Heat Capacity ($kJ/m^3K$) |
| 1 | sulfuric acid | 25 | 4 | 8 | 10 | 35 | 1525 |
| 2 | sulfuric acid | 25 | 4 | 20 | 20 | 7.8 | 800 |
| 3 | sulfuric acid | 25 | 4 | 30 | 30 | 0.35 | 720 |
| 4 | oxalic acid | 30 | 3 | 40 | 50 | 0.13 | 314 |
| 5 | oxalic acid | 40 | 3 | 50 | 60 | 0.09 | 294 |
| 6 | phosphoric acid | 190 | 3 | 50 | 70 | 0.08 | 258 |

As seen from the results in Table 1, the porosity or pore size can be adjusted by changing the applied voltage and the kind of the electrolytic solution.

Figure 3:
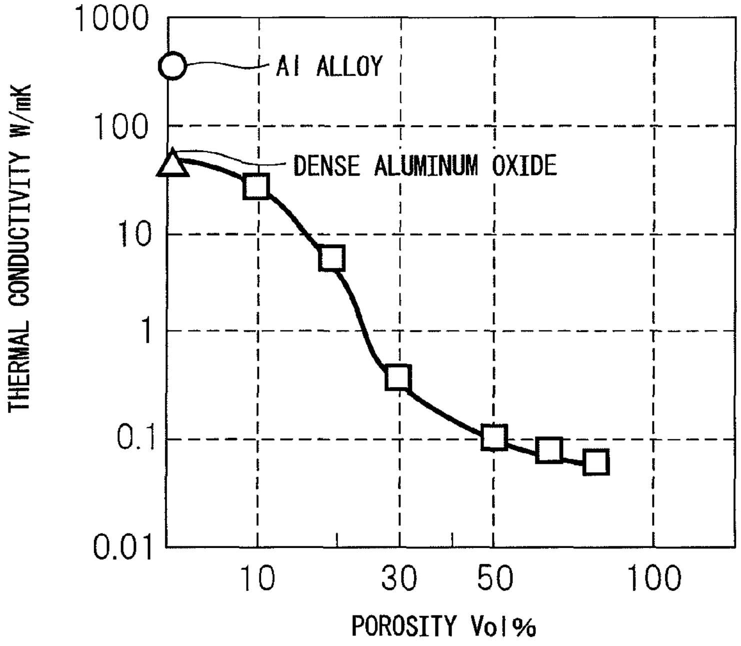
FIG. 3 shows the relationship between porosity and thermal conductivity of the anodic oxide film (thickness: 100 μm).

Also, based on the results in Table 1, the relationship between porosity and thermal conductivity in the anodic oxide film is clarified in FIG. 3. It is seen that as the porosity is increased, the thermal conductivity is decreased. In particular, the porosity at which the thermal conductivity was abruptly decreased was 20% or more, preferably 30% or more.

Figure 4:
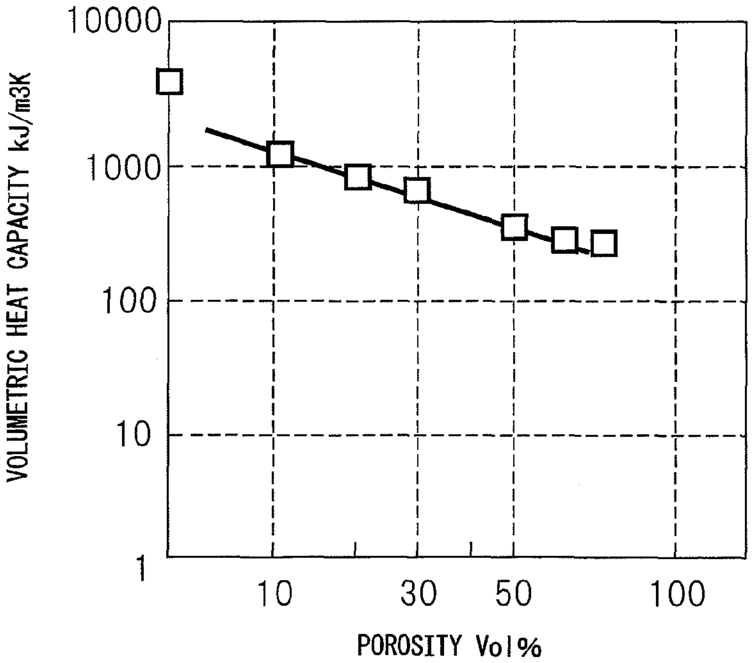
FIG. 4 shows the relationship between porosity and volumetric heat capacity of the anodic oxide film (thickness: 100 μm).

Furthermore, based on the results in Table 1, the relationship between porosity and volumetric heat capacity in the anodic oxide film is clarified in FIG. 4. It is seen that as the porosity is increased, the volumetric heat capacity is decreased.

(Relationship Between Thermal Property and Fuel Consumption of Anodic Oxide Film)

Figure 5:
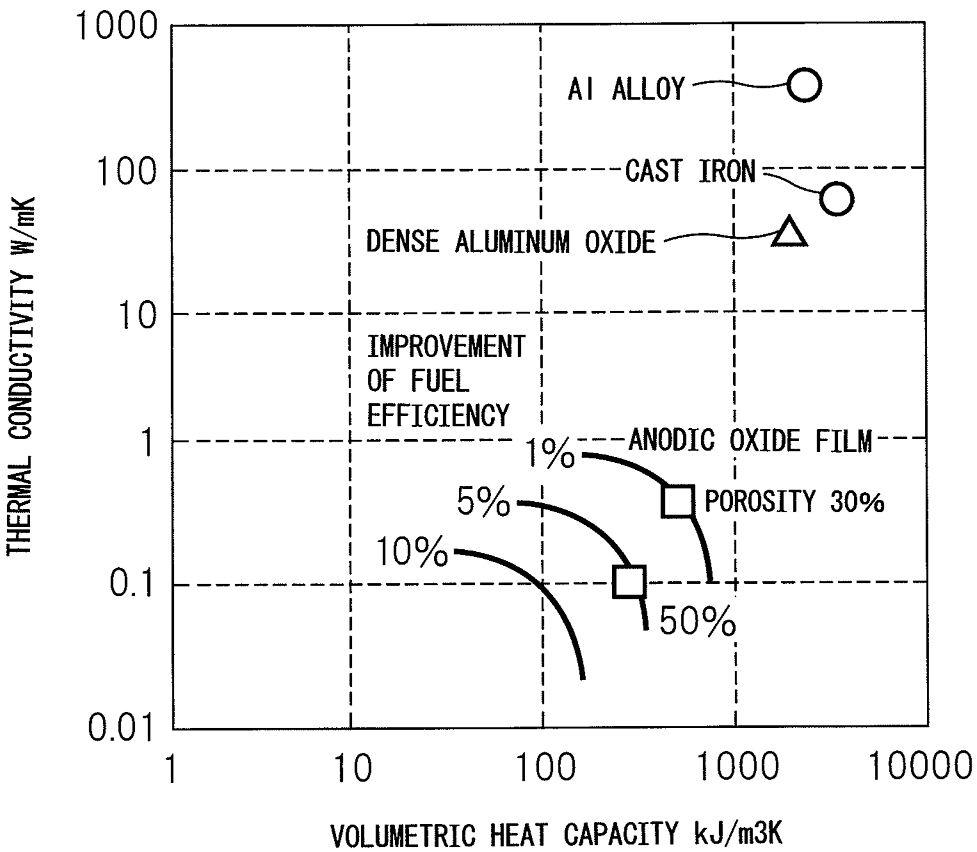
FIG. 5 shows the relationship between thermal property (thermal conductivity, volumetric heat capacity) of the anodic oxide film (thickness: 100 μm) and improvement of fuel efficiency.

On the piston head top surface and the cylinder head bottom surface (i.e., the portion coming into contact with a combustion gas) each forming a part of the inner surface of the combustion chamber of a gasoline reciprocating engine with displacement of 1,800 CC, an anodic oxide film (porosity: 30% and 50%) having a thickness of 100 μm was formed using the above-described anodic oxidation conditions. Thereafter, measurement of 10-15 mode fuel consumption in the gasoline reciprocating engine above was performed. As a result, the thermal conductivity and volumetric heat capacity of the anodic oxide film working out to the inner surface of the combustion chamber were strongly correlated with the fuel consumption, where the improvement ratio of fuel efficiency was 1% at a porosity of 30% and the improvement ratio of fuel efficiency was 5% at a porosity of 50%. The improvement ratio of fuel efficiency was based on the fuel consumption when the anodic oxidation treatment was not performed. The relationship between thermal property (thermal conductivity, volumetric heat capacity) and improvement of fuel efficiency of the anodic oxide film is clarified in FIG. 5. In FIG. 5, thermal properties of samples where the piston head top surface and the cylinder head bottom surface are made of dense aluminum oxide, cast iron or Al alloy and not subjected to an anodic oxidation treatment, are also plotted.

(Durability·Reliability of Anodic Oxide Film)

Furthermore, a durability test against up-down movement of the piston (durability test time: 300 hours, from 800 to 5,000 r.p.m.) was performed using the anodic oxidation-treated engine above. Separation and drop-off of the anodic oxide film were not observed before and after the durability test, revealing high long-term reliability.

(Relationship Between Thickness of Anodic Oxide Film and Fuel Efficiency)

On the piston head top surface and the cylinder head bottom surface (i.e., the portion coming into contact with a combustion gas) each forming a part of the inner surface of the combustion chamber of a gasoline reciprocating engine with displacement of 1,800 CC, an anodic oxide film with a thickness of 20 to 500 μm was formed using anodic oxidation conditions giving a porosity of 50% by varying the anodic oxidation treatment time in the range of 30 minutes to 15 hours. Thereafter, measurement of 10-15 mode fuel consumption in the gasoline reciprocating engine above was performed. The anodic oxidation conditions, the obtained film thickness and porosity, and the improvement ratio of fuel efficiency are clarified in Table 2. The improvement ratio of fuel efficiency was based on the fuel consumption when the anodic oxidation treatment was not performed.

TABLE 2

Table 2: Anodic Oxidation Time and Relationship Between Film Thickness and Improvement Ratio of Fuel Efficiency

| | Anodic Oxidation Conditions | | | Film Structure | | Improvement Ratio of Fuel Efficiency (%) |
|---|---|---|---|---|---|---|
| Sample No. | Electrolytic Solution | Maximum Applied Voltage (V) | Time (h) | Film Thickness (nm) | Porosity (vol. %) | |
| 4 | oxalic acid | 30 | 3 | 100 | 50 | 5 |
| 7 | oxalic acid | 40 | 0.5 | 20 | 50 | 0 |
| 8 | oxalic acid | 40 | 2 | 50 | 50 | 2.4 |
| 9 | oxalic acid | 40 | 6 | 200 | 50 | 4.2 |
| 10 | oxalic acid | 40 | 9 | 300 | 50 | 3 |
| 11 | oxalic acid | 40 | 15 | 500 | 50 | 0.5 |

Figure 6:
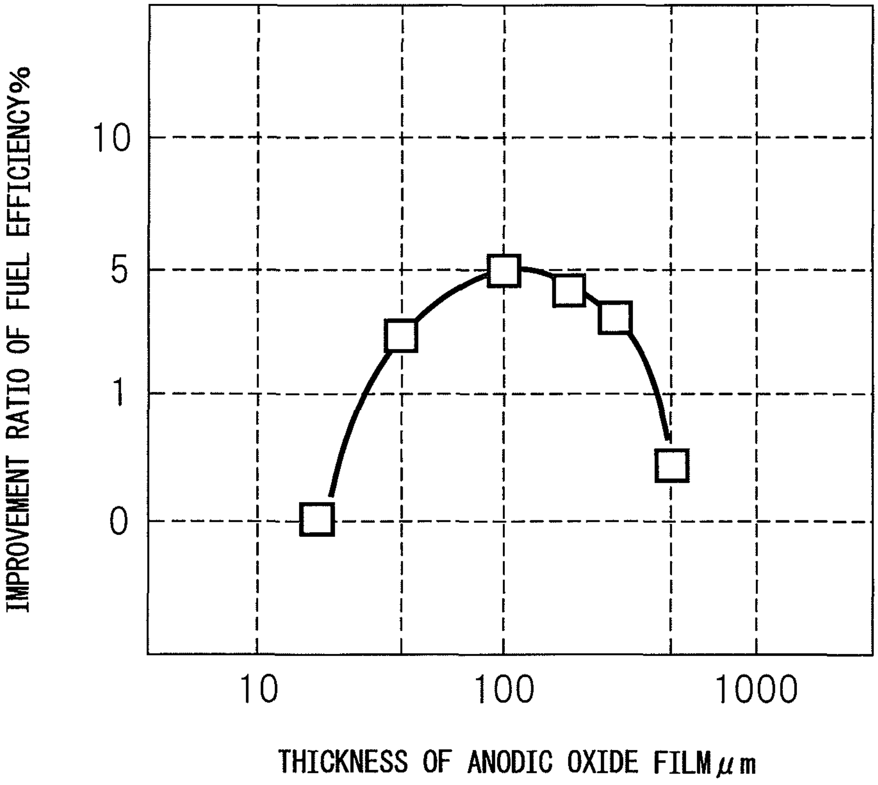
FIG. 6 shows the relationship between thickness of the anodic oxide film (porosity: 50 vol %) and improvement of fuel efficiency.

Based on the results in Table 2, the relationship between the thickness of the anodic oxide film (porosity: 50 vol %) and the improvement of fuel efficiency is clarified in FIG. 6. The thickness of the anodic oxide film, with which the effect of improving the fuel efficiency is obtained, is from more than 20 μm to 500 μm. The thickness of the anodic oxide film is preferably from 50 to 300 μm. This is considered because if the film thickness is less than 50 μm, the heat-shielding effect is insufficient, whereas if it exceeds 300 μm, the heat capacity is increased.

The invention claimed is:

1. An engine combustion chamber structure, wherein an anodic oxide film having a thickness of from more than 20 μm to 500 μm and a porosity of 20% or more and a pore diameter in the nanometer order is formed on the inner surface of the engine combustion chamber.

2. The engine combustion chamber structure as claimed in claim 1, wherein the thickness of said film is from 50 to 300 μm.

3. The engine combustion chamber structure as claimed in claim 1, wherein the porosity of said film is from 20 to 70%.

4. The engine combustion chamber structure as claimed in claim 1, wherein the anodic oxide film has a thermal conductivity of 7.8 W/mK or less and a volumetric heat capacity of 800 kJ/m$^3$K or less.

5. A method for manufacturing the engine combustion chamber structure claimed in claim 1, comprising:

preparing an aqueous solution containing at least one of phosphoric acid, oxalic acid, sulfuric acid and chromic acid, as an electrolytic solution used for anodic oxidation, in which the concentration of said electrolytic solution is from 0.2 to 1.0 mol/l and the temperature of said electrolytic solution is from 20 to 30° C., and performing an anodic oxidation treatment by using said electrolytic solution.

6. The method as claimed in claim 5, comprising:

performing the anodic oxidation treatment by using, as an anode, a desired portion of a member constituting the engine combustion chamber such that when the engine combustion chamber is fabricated, an anodic oxide film is formed on the inner surface of the combustion chamber.

7. The engine combustion chamber structure as claimed in claim 3, wherein the anodic oxide film has a thermal conductivity of 7.8 W/mK or less and a volumetric heat capacity of 800 kJ/m$^3$K or less.

* * * * *